United States Patent [19]  [11] 4,300,633
Stewart  [45] Nov. 17, 1981

[54] METHOD OF CEMENTING WELLS WITH FOAM-CONTAINING CEMENT

[75] Inventor: Robert B. Stewart, Lagos, Nigeria
[73] Assignee: Shell Oil Company, Houston, Tex.
[21] Appl. No.: 156,848
[22] Filed: Jun. 5, 1980
[30] Foreign Application Priority Data Dec. 3, 1979 [GB] United Kingdom ............... 41635/79

[51] Int. Cl.$^3$ .......................... E21B 33/14; E21B 47/00
[52] U.S. Cl. ................................... 166/250; 166/292; 166/293; 166/362
[58] Field of Search ............... 166/250, 253, 292, 293; 106/87, 88, 90

[56] References Cited

U.S. PATENT DOCUMENTS

| | | | |
|---|---|---|---|
| 2,236,987 | 4/1941 | Bechtold | 166/293 |
| 2,288,556 | 6/1942 | Vollmer | 106/87 X |
| 3,098,754 | 7/1963 | Dixon | 106/88 |
| 3,573,941 | 4/1971 | Edwards | 106/88 |
| 3,798,186 | 3/1974 | Nakade et al. | 166/293 |
| 3,926,257 | 12/1975 | Marrast et al. | 166/293 |
| 4,234,344 | 11/1980 | Tinsley et al. | 106/88 |

OTHER PUBLICATIONS

Aldrich et al., "Strength Permeabilities and Porosity of Oilwell Foam Cement", *Journal of Engineering for Industry*, Aug. 1976, pp. 1103–1106.

*Primary Examiner*—Stephen J. Novosad
*Assistant Examiner*—George A. Suchfield

[57] ABSTRACT

To cement the annulus around a casing string in a well penetrating an underground formation, a column of cement slurry which is or includes a foam cement slurry is placed in the annulus and allowed to set. The amount of gas contained in the slurry and the set cement is such that the density in the cement slurry column and the cement in the annulus increases with increasing depth.

3 Claims, 6 Drawing Figures

HYDROSTATIC PRESSURE
P ⟶

METHOD OF CEMENTING WELLS WITH FOAM-CONTAINING CEMENT

BACKGROUND OF THE INVENTION

The present invention relates to a method of cementing wells, such as oil wells, gas wells or water wells penetrating underground formations. To exclude fluids from the annular space around a casing string or other pipe placed in the well, a cement slurry is placed in the annular space and the cement, after setting thereof, will seal the passage through the annulus and bond the casing string to the wall of the well. The cement slurry may be pumped directly into the annulus, or may first be passed downwards through the casing string (or through a special cementing tube suspended in the string) and subsequently upwards through the annular space around the casing string.

During the cementing operations, care should be taken that the pressure at each level of the annulus is less than the fracturing pressure at the relevant depth level, since the formation will otherwise be fractured and the cement slurry will pass into the formation rather than filling up the annulus around the casing. To obviate this problem, which is in particular present when cementing wells that penetrate underground formations located below a body of water, such as a sea or ocean, so-called lightweight cements have been developed. The cement slurries of the lightweight type have a density that is considerably lower than the density of the normal cement slurries, such as in the range of 900–1900 kg/m$^3$, whereas the density of a normal cement slurry is about 1920 kg/m$^3$.

The density decrease of cements is often obtained by adding granular material of low density to a pumpable cement slurry. Such material may be bentonite, coal, asphalt, fired clay and void-containing particles that cannot be wetted by water (such as hollow sealed ceramic spheres). Care should then be taken that the compressive strength of the cement after setting is not decreased to an undesirable extent.

Another attractive manner of reducing the density of a cement slurry is by adding gas (such as air and nitrogen) to the cement slurry in a manner such that the gas forms a fine dispersion in the slurry, which dispersion may be stabilized by means of suitable foaming agents.

Various procedures have been proposed for forming porous or other types of lightweight cements for the above or other uses. For example, a lightweight bitumen or aluminum silicate-containing "Libit" cement for sealing along weak formations is described in the V. P. Quist/J. J. M. Zuiderwijk U.S. Pat. No. 3,887,385. A lightweight low water-loss cement containing a low density calcined shale cement, attapulgite and water, which is said to provide improved sealing along gas-producing sands, is described in U.S. Pat. No. 4,120,360. U.S. Pat. No. 3,926,257 suggests sealing along such gas sands with a cement slurry which contains a surfactant for converting any gas which diffuses into the slurry into an immobile foam. Numerous U.S. Pat. Nos. such as 2,191,555; 2,163,207; 2,371,928; 2,228,556; 3,591,394 and British No. 1,541,129, describe various ways of generating gas within a cement slurry in order to form a foam cement suitable as a lightweight porous cement, a permeable cement, a pre-stressed cement, a non-shrinking cement and the like. Paper No. 75-PET-10 by B. H. Aldrich and B. J. Mitchell, "Strength Permeabilities and Porosities of Oil Well Foam Cement", presented at the Petroleum Mechanical Engineering Conference in Tulsa in 1975 and a Colorado School of Mines thesis T-1604 in 1974 by B. H. Aldrich on "Strength, Permeability and Porosity of Cellular Oil Well Cement" discusses the relationship between permeability and porosity and indicates that there is a jump from negligible permeability to high permeability when the porosity exceeds about 52%.

The object of the invention is to provide a method of cementing a well in a formation that is prone to fracturing, by means of a lightweight foam cement slurry, whereby an optimal strength of the set cement column will be obtained.

SUMMARY OF THE INVENTION

The method according to the invention of cementing the annulus around a pipe or casing string in a well penetrating an underground formation, includes the steps of placing a column of foam-containing cement slurry in the annulus and allowing the cement slurry to set. The hydrostatic pressure at each depth within the column of cement slurry is less than the fracturing pressure but more than the fluid pressure in the formation at the same depth. And, the volume of gas contained in the foamed cement slurry and the column of set cement is such that the density of the cement column is greater in the lower region than in the upper region.

The density of the cement column may increase gradually or incrementally from the top of the cement column to the lower region thereof.

DESCRIPTION OF THE INVENTION

The present invention is at least in part premised on the discovery that the interrelationship of the fluid pressure gradients and fracturing pressure gradients within subterranean earth formations and the physical and chemical properties of foamed and conventional cement slurries makes it feasible and advantageous to use the following process for flowing a cement slurry into a well so that the slurry forms a column within an annulus around a pipe which is to be bonded to the adjacent earth formations. The amount of gas or gas-forming chemicals contained in the cement slurry being flowed into the well is adjusted so that, within the annulus, (a) at least near the top of the column, the cement slurry comprises a foam, (b) the largest proportion of gas or gas-forming chemicals included within any portion of the inflowing cement slurry is insufficient to form a cement having a porosity of more than about 52%, (c) prior to the setting of the cement, the hydrostatic pressure within the cement slurry is, at each depth, greater than the formation fluid pressure but less than the fracturing pressure of the adjacent earth formations and (d) after setting, the cement is, at each depth, strong enough to sustain the stresses to which it is subjected. The so-inflowed cement slurry and the pipe it surrounds are kept substantially static during the setting of the cement.

Because of such an interrelationship, in a preferred embodiment of this invention, it is possible and preferable to mix proportioned amounts of pressurized gas with the cement slurry being pumped into the well. The proportion added to each portion of cement slurry is monitored by at least incrementally measuring the density of the gas-containing slurry. The proportion of the gas being added is adjusted to the extent necessary to ensure that the column of cement slurry which is formed in the annulus: contains foam near the top of the column; is free of any portion having a porosity exceeding about 52%; provides a hydrostatic pressure which exceeds the formation fluid pressure at each depth, without exceeding the formation fracturing pressure at any depth; and is capable of setting to a cement which, at each depth, is strong enough to sustain the stresses to which it is subjected.

The foaming agents used in a foam cement slurry must be active in the highly alkaline environment of the cement and show resistance to bivalent organic cations if seawater is used as make up water for the cement slurry. Anionic surfactants with the general formula $[C_nH_m\text{—}SO_3]^-$ and $[C_nH_m\text{—}O\text{—}SO_3]^-$ with alkali ions as counter ions, n and m being in the range of 12–40, have been found to be particularly suitable. An example of a surfactant with very good performance is sodium lauryl sulphonate sold under the trade name Elfan OS 46 by AKZO.

When reducing the density of a cement slurry by means of a gas, such gas may be entrained with the slurry when the latter is injected into the well, or in an alternative manner, gas generating chemicals may be added to the slurry. Such chemicals may start the generation of gas during the introduction of the slurry into the well. The proportion and reaction rates of such chemicals should be such that the amounts of gas present in the slurry when the slurry is in the annulus are sufficient to reduce the density of the slurry to an extent required to obviate fracturing of the formations surrounding the well.

Because of the compressibility of gas, where the ratio of the amount of gas to the amount of cement slurry is constant, the volume of the gas—for example as measured under standard conditions (that is 1 bar and 273.15° K.)—varies along the length of the set column of cement in the annulus of a well. The variation is such that the density and porosity gradients of the set cement tend to remain substantially constant over the height of the cement column.

In cementing wells that pass through formations with low fracturing pressures, or in marine wells situated below relatively deep water, a foam cement slurry of extremely low density should be applied to obviate fracturing. It has been experienced, however, that the foam cement with extremely low density may have—after setting thereof—insufficient strength for meeting the requirements that are to be fulfilled at the lower end of the cemented tubing or casing. Low strength foam cement at this level may be cracked when the drilling proceeds through the cemented tubing or casing to deeper levels. Further, the properties of such a low-strength foam cements may be insufficient to meet the requirements in a fluid productive interval in which fluids are to be recovered from an underground formation. In this interval, various well completion procedures are often to be carried out to increase the productivity of the formation, such as perforating the casing and the cement layer around the casing, acidizing treatments, and fracturing procedures, and foam cements with extremely low density and strength may be insufficient to withstand such procedures.

In one embodiment the present invention includes the steps of flowing a volume of a settable cement slurry into the annulus while continuously adding gas to the slurry so as to form a foam cement slurry, the gas being added at a pressure sufficient to enter the slurry flow at a rate such that the density of the column of cement in the annulus increases in a downward direction, and allowing the foam cement slurry to solidify in the annulus.

In an alternative embodiment of the invention, a method of cementing the annulus around a casing string in a well includes the steps of flowing a volume of settable cement slurry into the well, the slurry containing chemicals generating gas in the slurry thereby forming a foam cement slurry which when present in the annulus forms a cement column with a density increasing from the top of the column to the bottom thereof, and having a hydrostatic pressure at the bottom that is less than the fracturing pressure at the level of the said bottom, and allowing the cement in the column to set.

It is desirable that the cement column obtained by application of the present invention have sufficient strength in the lower region thereof so as to meet the conditions existing at the lower end of the casing, and at the same time give an adequate support to the casing string at a fracture gradient that is sufficiently low to obviate formation fracturing. Particularly in relatively deep locations within wells, it may be desirable to reduce the amount of the gas or gas-generating compounds which are included in portions of the cement slurry which will become located in the lower portion of the cement slurry column within the annulus. In the relatively deep locations, the overburden pressures and fracturing pressures tend to be relatively high and it may be desirable to inflow a portion of cement slurry containing little or no gas or gas-forming material to be placed at or near the bottom of the interval being cemented.

Figure 1:
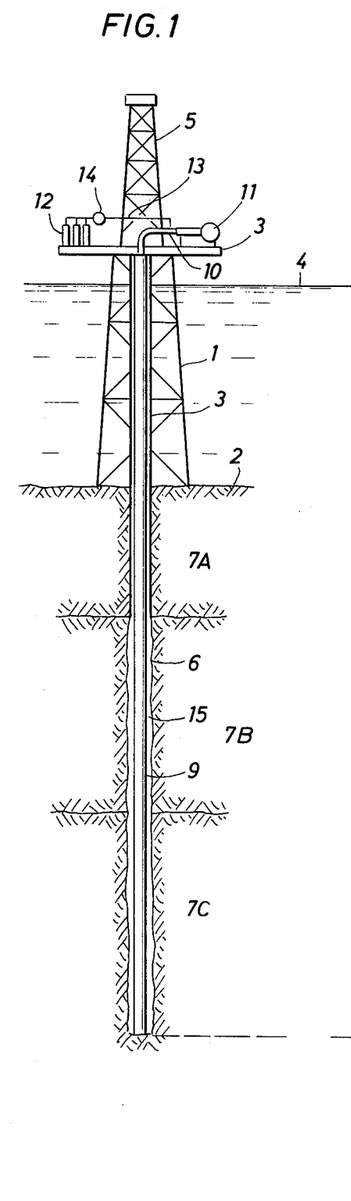
FIG. 1 is a schematic illustration of a well and the subterranean formations encountered by a marine well.

FIG. 1 shows a structure 1 supported on the seabottom 2. The structure 1 supports a platform 3 at some distance above the sea level 4. A drilling rig 5 is carried by the platform 3, and a hole 6 has been drilled in the formations 7A, 7B and 7C below the sea bottom 2. This hole has been drilled by drilling equipment (not shown) such as a drill string with a drill bit attached thereto which is lowered into the formations 7 via the conductor string 8 that is supported from the platform 3.

After the hole 6 has reached a desired depth, the drilling equipment is lifted from the hole 6 and a casing string 9 is lowered into the hole and suspended from the platform 3. Details of the suspension of the casing string 9 are not shown since such suspensions are known per se.

The inlet to the casing string 9 is subsequently brought into communication with a cement pump 11 via a conduit 10. The pump can draw cement slurry from a (not shown) suitable source of cement slurry.

High pressure vessels 12 containing nitrogen under pressure are in communication with the conduit 10 by means of a pipe 13 provided with a valve 14. If the vessels contain liquid nitrogen, suitable vaporization units are installed between the vessels and the entry of the pipe 13 to the conduit 10.

A cement slurry of a suitable composition is then forced by the pump 11 into the casing string 9 via the conduit 10. Simultaneously therewith, nitrogen gas is supplied to the flow of cement slurry in the conduit 10 at a pressure sufficient to enter the cement slurry flow in the conduit 10. If required, suitable mixing means may be installed and suitable foaming agents may be added to promote the formation of a homogeneous gas-containing foam cement slurry, that passes down the casing 9.

The nitrogen gas supply to the conduit 10 is controlled by the valve 14 in the pipe 13 in a manner such that the ratio between the flow rate of the cement slurry leaving the pump 11 and the flow rate of the nitrogen gas passing through the pipe 13 is kept substantially constant.

It will be appreciated that the gas present in the foam cement slurry will be compressed during the travel of the slurry to the lower end of the casing 9 since the hydrostatic pressure increases in the direction of travel. On passing out of the casing and flowing upwards in the annulus 15 around the casing 9, the gas expands again. When the foam cement slurry is finally in place in the annulus 15, the pressure on the gas bubbles in the foam cement column increases gradually from the top of the cement column to the bottom thereof. Since the gas/cement ratio of the slurry at injection thereof in to the casing 9 was kept substantially constant, the density of the cement column in the annulus 15 will gradually increase from the top of the column down to the bottom thereof. As a result thereof, the compressive strength of the foam cement after setting will increase from the top of the column down to the bottom thereof. Thus, the compressive strength of the set cement in the region of the lower end of the column, can be sufficiently high for the purpose intended (such as for drilling through in a tophole or intermediate string cementing job, or for completion procedures when the lower end of the column is at the level of a hydrocarbon fluid producing formation), whereas the compressive strength of the cement in the upper parts of the column, which is not subjected to high loads, is relatively low. It will be appreciated that although a dense cement is so placed in the lower end of the column, the hydrostatic pressure in the column prior to setting of the cement has not exceeded the fracturing pressure of the formation.

Figure 2:
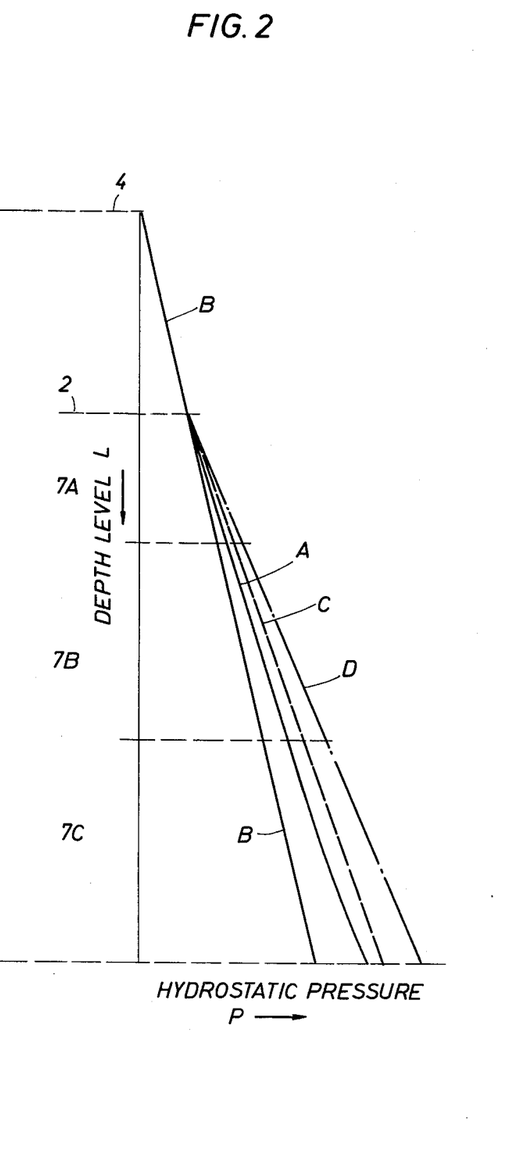
FIG. 2 shows a plot of the variations of hydrostatic pressures of various fluids with depth below sea level at the location illustrated by FIG. 1.

In the diagram in FIG. 2, curve A indicates the hydrostatic pressure prevailing at the various levels in the foam cement column present in the annulus 15 prior to setting. The hydrostatic pressure P is indicated along the horizontal axis, and the depth level L below the sea level 4 is indicated along the vertical axis of the diagram. The density of the foam cement in the column is in the lower region thereof higher than at the levels near the top thereof. The density increases gradually from the top to the bottom of the column.

The straight line B in the diagram of FIG. 2 indicates the hydrostatic pressure in the well 6 when it contains sea water over the full height thereof.

The straight line C indicates the pressure at which the formations 7 will fracture, whereas the straight line D indicates the hydrostatic pressure that would prevail in the cement column in the annulus if no gas would have been added to the cement. It will be clear from the diagram, that a column of sea water in the well 6 cannot fracture anyone of the formations 7A, 7B and 7C, since the hydrostatic pressure present therein is always lower than the fracturing pressure C. A cement column that has not been treated for obtaining a relatively low density (see straight line D) might fracture any of those formations.

The cement slurry that has been treated to form a gas-containing foam slurry having a substantially constant amount of gas (measured at standard conditions) per unit volume of cement will, when present in the annulus, form a cement column wherein the hydrostatic pressure varies in accordance with the curve A. At any level in the well, this pressure should be lower than the pressure at which fracturing will occur. Moreover, the column has its maximum density, and consequently its greatest compressive strength, at the bottom part thereof. As has already been explained above, this large compressive strength at the lower levels of the well is advantageous in view of the treatments that are to be carried out at these levels after the cement column has set.

It will be appreciated that the method according to the invention may also be carried out by varying the amount of gas supplied per unit volume of cement that is supplied to the well. The variations in the amount of gas are chosen such that the density of the foam cement column in the annulus increases in the downward direction, and the hydrostatic pressure at the bottom of the column is less than the fracturing pressure of the formation at that level.

Any gas other than nitrogen gas as described with reference to FIG. 1 may be used for carrying out the present cementing method, such as pressurized air that is supplied to the cement conduit 10 (or to a foam generating unit that is inserted in this conduit) from a compressor unit.

Also, the gas may be generated by chemicals that are mixed with cement slurry prior to injecting the slurry into the well. Gas-generating agents for use in forming foam cement are known per se and are therefore not described in detail. A suitable agent for this purpose is aluminum powder that may be mixed with dry cement prior to forming the cement slurry by the addition of water. It will be appreciated, however, that application of the method according to the present invention is not restricted to the use of aluminum as a gas-generating agent, nor to any other type of gas-generating agent or means.

The reaction rate of the gas-generating agents should be controlled (if necessary by adding a reaction rate controller) so that essentially all of the gas has been generated prior to the moment that the total cement column is present in the annulus. The amounts of the gas-generating agents present per unit volume of cement slurry should be controlled so that the density of the cement column at the top thereof is smaller than the density at the lower region thereof, and that the hydrostatic pressure at the lower region is lower than the fracturing pressure of the formation at the level of that region. Attractive results will be obtained by controlling the supply of chemicals to the cement in a manner such that the column of foam cement slurry in the annulus has a density that gradually increases from the top of the column to the bottom thereof. The amount of gas-generating agents per unit volume of cement slurry, that are present in or supplied to the cement slurry that is passed into the well, may either be kept substantially constant (as a result whereof the density will gradually increase in a downward direction) or be varied (gradually or stepwise), provided that the variation is such that the density of the cement column increases in a downward direction and that the hydrostatic pressure at the lower region is lower than the fracturing pressure of the formation at the level of that region, i.e., where the inclusion of gas or gas-generating agents with the inflowing cement slurry is terminated, such a termination should be made in the portion which will be placed at the bottom of the column of cement slurry.

The cement slurry when in place in the annulus is kept stationary until solidification of the cement has taken place. The solidified cement column in the annulus has a density that is relatively high near the bottom of the column and relatively low near the top thereof. The compressive strength of the column is largest in the region of the lower parts thereof.

HYPOTHETICAL USE IN OFFSHORE CEMENTATION

To demonstrate the potential of foamed cements, specimen hydrostatic calculations are given for two hypothetical offshore primary cementations.

The boundary conditions and assumptions used in these calculations are as follows:
1. The density of the cement slurry at the sea-bed should substantially equal that of sea-water; this should prevent formation breakdown.
2. The porosity of any foamed cement should not exceed about 52%; since it is known that there is a jump from a negligible permeability to a high permeability when the porosity is increased above 52%.
3. The gas used to foam the cement is a substantially weightless ideal gas and is insoluble in the cement slurry.
4. Well temperature is substantially constant over the casing intervals considered.
5. The fracture gradient of the formation is 13.6 kPa/m(0.6 psi/ft).

Three types of cement slurries (foamed and unfoamed) will be considered, viz. Libit-G (e.g., as described in U.S. Pat. No. 3,887,385), Pozmix and an API cement slurry. The specific gravities of their neat (unfoamed) slurries are 1.31, 1.60 and 1.91, respectively.

EXAMPLE 1—GAS REQUIREMENTS

Reasonable assumptions as to pumping rate and material requirements are that an API cement slurry be mixed at 13.25 l/s (5 bbl/min), and that the 610 m (2,000 ft) annulus to be filled lies between a 17½" hole and a 13⅜" casing capacity 39268 l (247 bbl). The average cement porosity over the annulus is 31%, which means that it contains 27,186 l (171 bbl) of neat cement slurry. The mixing time for this volume would be about 34 minutes.

If a constant temperature of 4° C. (40° F.) is assumed from the sea bed to the casing shoe, it can be shown that (at 760 mm Hg and 273° K.) 4100 l, or 164 SCF, of nitrogen are required for each barrel of API cement slurry.

Therefore, this cementation would require $700 \times 10^3$ l ($28 \times 10^3$ SCF) nitrogen delivered at 343 l/s (823 SCF/min). This rate is well within the capability of existing liquid-nitrogen units which are currently used in oil and gasfield operations. Such a supply unit has a nitrogen capacity of $4.65 \times 10^6$ l (186,000 SCF), which it can discharge at rates up to $2.5 \times 10^3$–$13.75 \times 10^3$ l/s (6,000 to 33,000 SCF/min), at pressures up to 69,000 kPa (10,000 psi) and at temperatures between $-1°$ C. and 93° C. (30° F. and 200° F.).

Foaming the cement with nitrogen after the cement pumps is therefore a realistic proposition. The nitrogen requirements for the less dense Libit and Pozmix slurries are correspondingly less.

However, bearing in mind that foamed cements are most likely to be used in top-hole cementations, where hydrocarbons are absent, compressed air might offer an attractive alternative to nitrogen as a gas filler. The capacity of a modest air compressor is more than adequate. Suitable corrosion inhibitors could be added to the slurry if considered necessary.

EXAMPLE 2; 20 INCH CASING

Assume that the 20" casing is set in a 26" hole. It can then be shown, by arguments similar to those used in Example 1, that the maximum gas-feed rate (at 5 bbl/min—slurry feed) is 55 l/s (133 SCF/min, which is also well within the capabilities of the commercially available liquid-nitrogen equipment.

EXAMPLE 3; 13⅜ INCH CASING

Consider a cementation (using gas proportions like those of Example 1) of a 13⅜" casing in an offshore well where the sea is 610 m (2,000 ft) deep and the casing shoe is set at 1,220 m (4,000 ft) below sea level.

Figure 3:
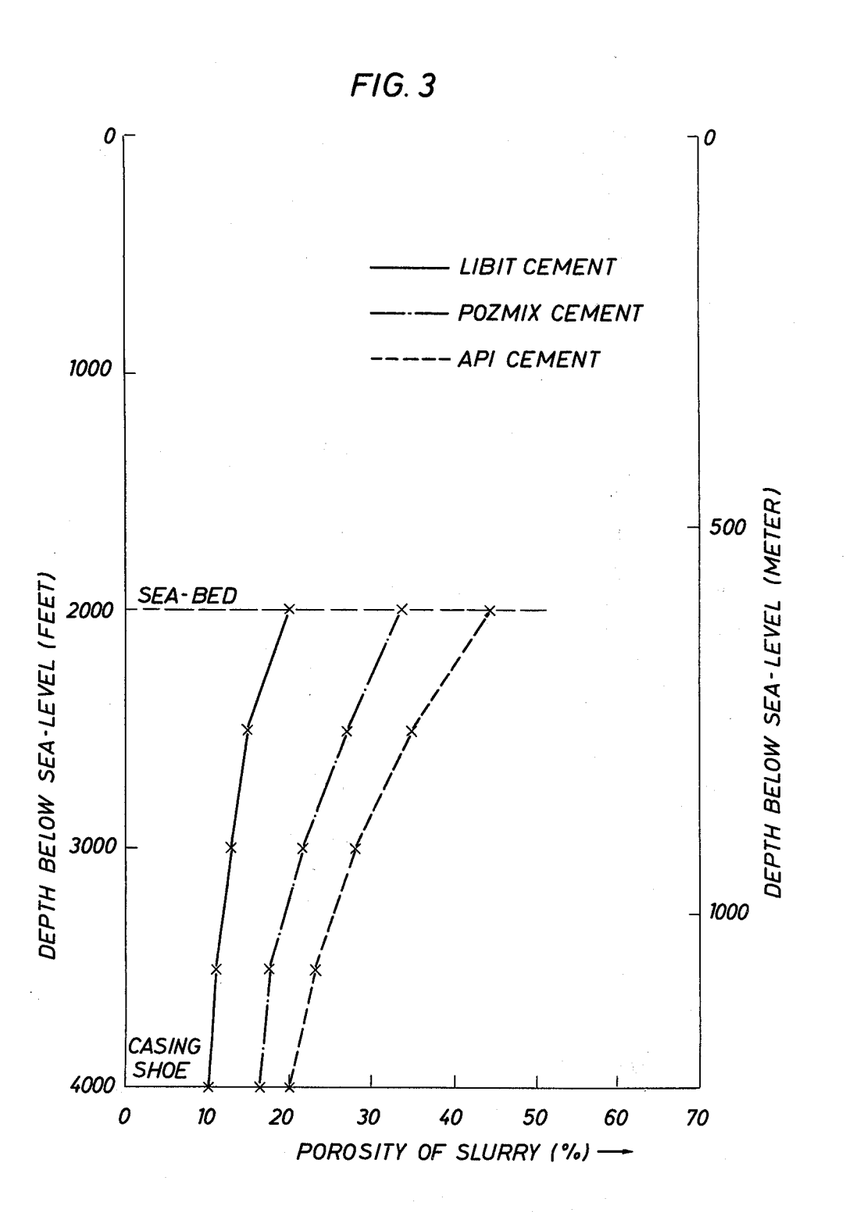
FIG. 3 shows the variation with depth of the porosity of various foam cements in a typical subterranean environment.

FIG. 3 shows that the porosity of a foamed Libit cement increases from 10% at the shoe to 21% at the sea bed.

Figure 4:
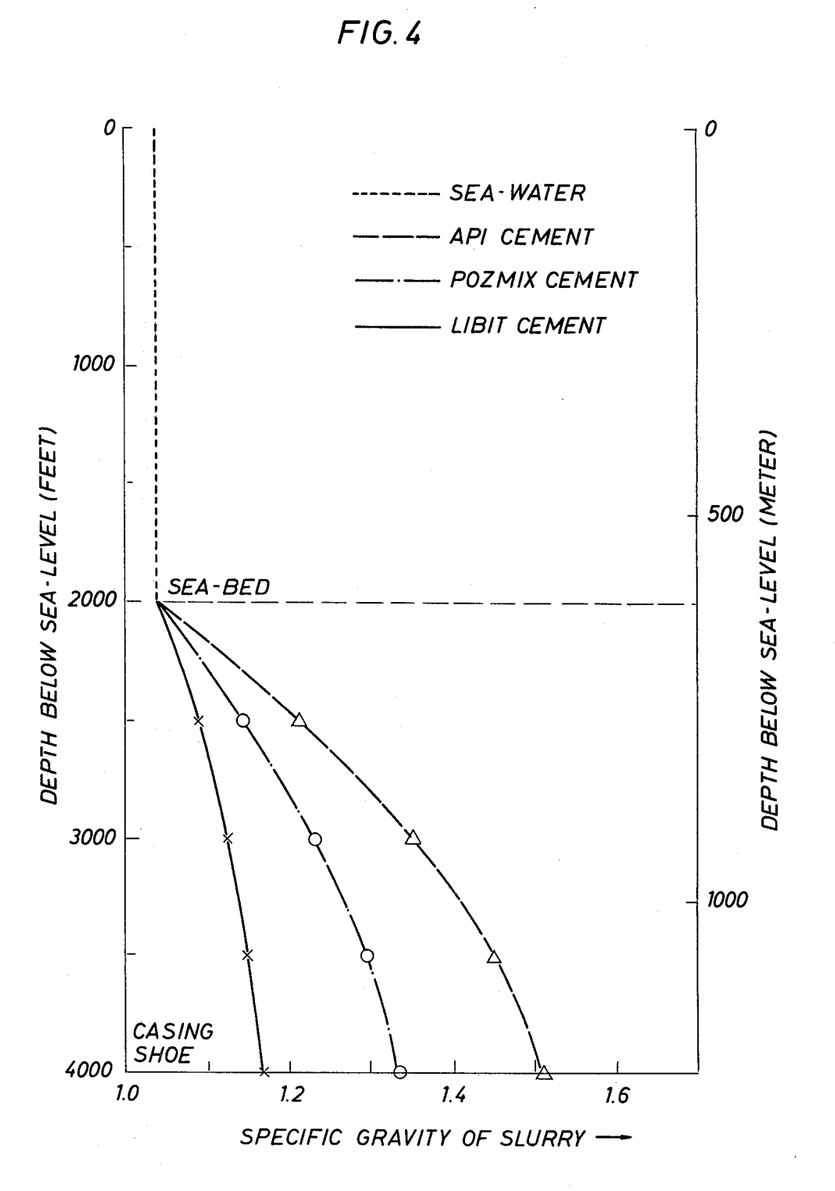
FIG. 4 shows the variations in specific gravity with depths of various foam cements in a similar environment.

FIG. 4 shows that the specific gravity of the slurry correspondingly decreased from 1.18 to 1.04.

Figure 5:
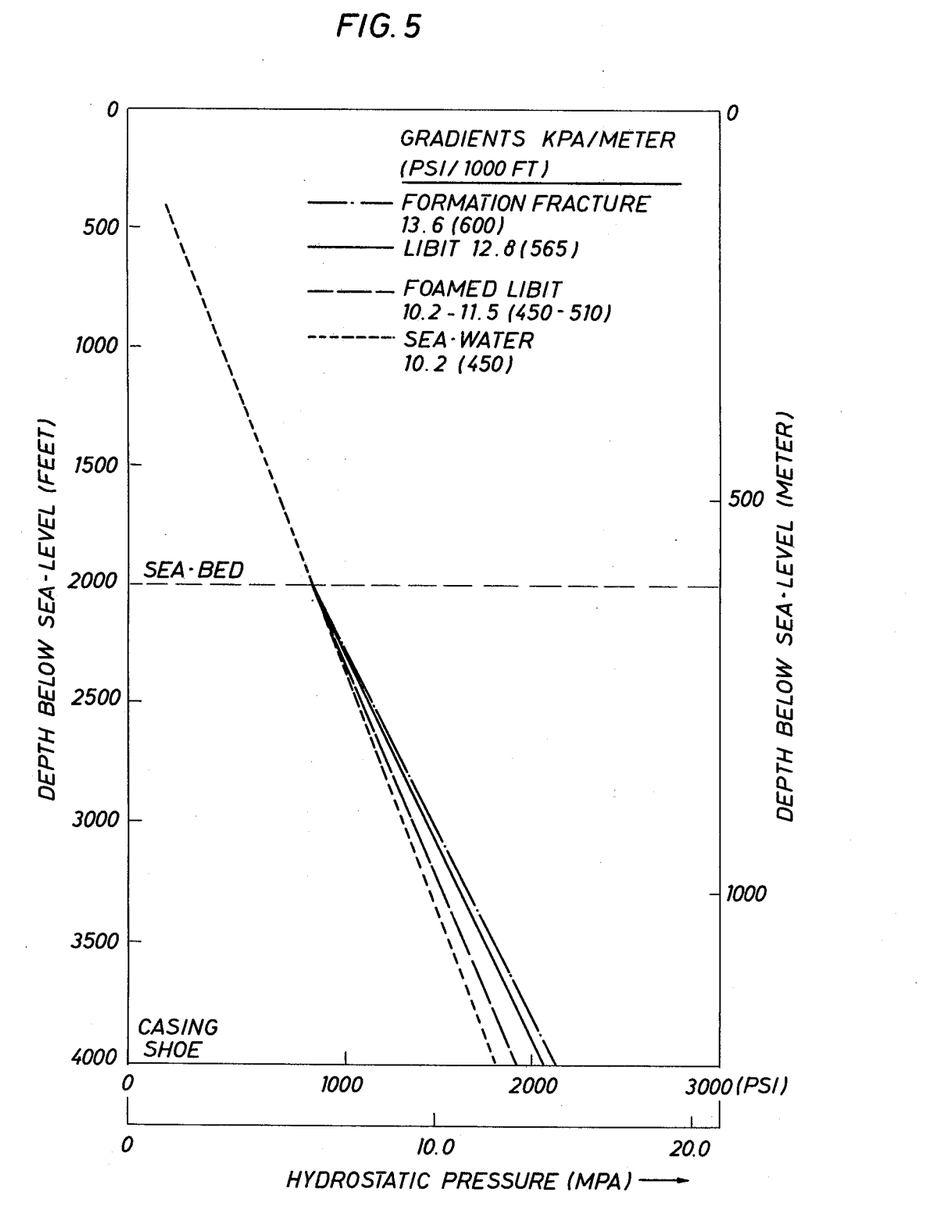
FIG. 5 shows the gradients of fracturing pressures, foamed and unfoamed cements and sea waters in typical offshore subterranean formations.

FIG. 5 shows how the foamed Libit hydrostatic gradient falls further below the fracture gradient than that of the neat Libit slurry. Both neat Pozmix and API cement slurries would fracture this formation, whereas their foamed slurries would not.

Note that Pozmix and API slurries foamed to the specific gravity of sea water have porosities of 35% and 46%, respectively (FIG. 3). These are well below the 52% limit for reliable strength. From a compressive strength point of view, the API cement would probably be preferable to the other two possibilities, although the gas requirements would be greater.

EXAMPLE 4; SHALLOW 13⅜ INCH CASING

Example 4 is similar to Example 3, except that the sea depth is reduced from 610 m to 91 m (2,000 to 300 ft) and the shoe depth from 1,220 m to 305 m (4,000 to 1,000 ft). This could correspond to a 20" casing cementation.

Figure 6:
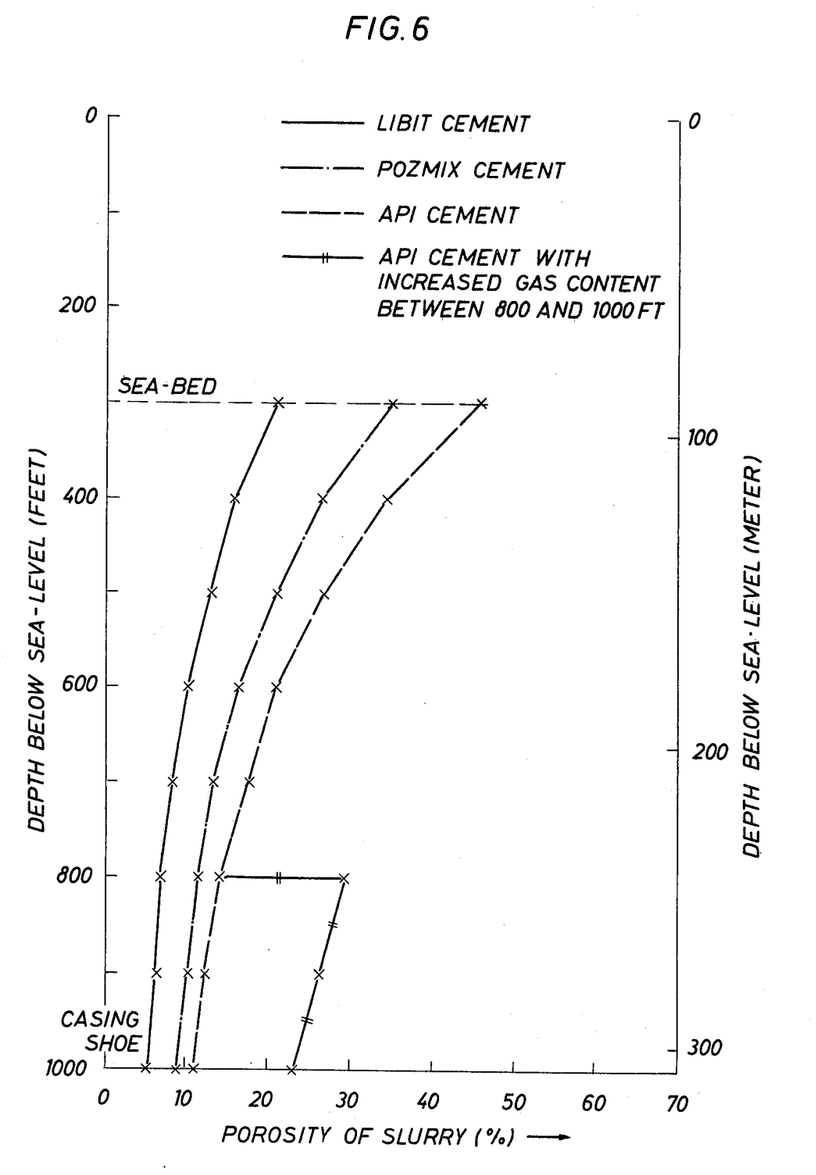
FIG. 6 shows the variation with depth in the porosity of various cements in relatively small portions of typical offshore subterranean earth formations.

The results are generally similar to those of Example 3 and are illustrated by FIG. 6. There are, however, differences of note. The variation in the densities of the foamed cements with depth is greater than in Example 3 and the foamed API cement would exceed the fracture gradient. However, such a problem can be overcome by increasing the gas-injection rate/gas content of the slurry below 244 m (800 ft). The porosity is instantaneously increased at 244 m (800 ft) from 15 to 30% (FIG. 6), with a corresponding decrease in the hydrostatic pressure.

What is claimed is:

1. A process for cementing a pipe within the borehole of a well comprising:

flowing a cement slurry into the well and into a vertically extensive column within the annular space between the pipe and the wall of the borehole;

mixing a proportioned amount of gas with at least some of the inflowing cement slurry while monitoring the proportion of gas in the slurry by at least incrementally measuring the density of the inflowing gas-containing slurry;

adjusting the proportion of gas in the inflowing slurry to the extent required so that, within the annulus, (a) at least near the top of the column, the cement slurry comprises a foam, (b) the maximum proportion of gas within any portion of the slurry is insufficient to form a cement having a porosity greater than about 52%, (c) prior to the setting of the cement, the hydrostatic pressure within the column of cement slurry, exceeds the formation fluid pressure but is less than the fracturing pressure of the adjacent earth formation, and (d) after setting the cement is, at each depth, strong enough to withstand the stresses applied at that depth; and, keeping the pipe and cement slurry substantially static at least throughout the setting of the cement.

2. The process of claim 1 in which the cement slurry is a conventional API cement slurry.

3. The process of claim 1 or 2 in which the proportion of gas within the cement slurry is different in at least two portions of the cement slurry which are flowed into the well.

* * * * *